(12) United States Patent  (10) Patent No.: US 8,515,812 B2
Moissinac et al.  (45) Date of Patent: Aug. 20, 2013

(54) PRODUCT-BASED ADVERTISING

(71) Applicants: Henri Moissinac, Paris (FR); Laura Robyn Chambers, Redwood City, CA (US); Jeffrey Wong, Los Altos, CA (US); Jacob Aqraou, Roskilde (DK)

(72) Inventors: Henri Moissinac, Paris (FR); Laura Robyn Chambers, Redwood City, CA (US); Jeffrey Wong, Los Altos, CA (US); Jacob Aqraou, Roskilde (DK)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 13/659,143

(22) Filed: Oct. 24, 2012

(65) Prior Publication Data

US 2013/0054321 A1  Feb. 28, 2013

Related U.S. Application Data

(63) Continuation of application No. 11/321,540, filed on Dec. 29, 2005, now Pat. No. 8,301,499.

(51) Int. Cl.
G06Q 30/00 (2006.01)
G07G 1/14 (2006.01)

(52) U.S. Cl.
USPC ..................................... 705/14.64

(58) Field of Classification Search
USPC ........................................ 705/14
See application file for complete search history.

(56) References Cited

U.S. PATENT DOCUMENTS

| 8,301,499 | B2 | 10/2012 | Moissinac et al. |
| 2001/0032128 | A1 | 10/2001 | Kepecs |
| 2002/0077901 | A1 | 6/2002 | Katz |
| 2005/0065811 | A1 | 3/2005 | Chu et al. |
| 2007/0156516 | A1 | 7/2007 | Moissinac et al. |

FOREIGN PATENT DOCUMENTS

| WO | WO-2007078561 A2 | 7/2007 |
| WO | WO-2007078561 A3 | 7/2007 |

OTHER PUBLICATIONS

"Application Serial No. 06839147.3 Office Action mailed Oct. 21, 2009", 6 pgs.
"U.S. Appl. No. 11/321,540, Advisory Action mailed Jun. 30, 2009", 2 pgs.
"U.S. Appl. No. 11/321,540, Decision on Appeals mailed Mar. 30, 2012", 5 pgs.
"U.S. Appl. No. 11/321,540, Final Office Action mailed Mar. 18, 2009", 15 pgs.

(Continued)

*Primary Examiner* — Colleen Hoar
(74) *Attorney, Agent, or Firm* — Schwegman, Lundberg & Woessner, P.A.

(57) ABSTRACT

A method and a system that identify seller ads to potential buyers within a network-based commerce system are provided. The method and system may operate to receive a request including a product identification from a seller, and assign to the seller, based on a distance function and the product identification, a matching identification entry included in a set of identification entries. The request may also include financial metrics. The method and system may further include operations to identify one or more seller ads associated with the matching identification entry, as determined by a distance measured between the matching identification entry and at least one extracted identification entry extracted from a selected content page and included in the set of identification entries. The identification of the one or more seller ads may also be determined by a relevance function based on the financial metrics.

23 Claims, 8 Drawing Sheets

(56) References Cited

OTHER PUBLICATIONS

"U.S. Appl. No. 11/321,540, Non-Final Office Action mailed Sep. 25, 2008", 17 pgs.

"U.S. Appl. No. 11/321,540, Notice of Allowance mailed Jun. 29, 2012", 8 pgs.

"U.S. Appl. No. 11/321,540, Pre-Appeal Brief Request for Review mailed Jul. 20, 2009", 4 pgs.

"U.S. Appl. No. 11/321,540, Response filed Dec. 22, 2008 to Non Final Office Action mailed Sep. 25, 2008", 11 pgs.

"U.S. Appl. No. 11/321,540, Response filed May 18, 2009 to Final Office Action mailed Mar. 18, 2009", 12 pgs.

"European Application Serial No. 06839147.3, Office Action mailed Oct. 5, 2011", 1 pg.

"European Application Serial No. 06839147.3, Response filed Apr. 3, 2012 to Office Action mailed Oct. 5, 2011", 4 pgs.

"Notice from the European Patent Office dated Oct. 1, 2007 concerning business methods", Official Journal of the European Patent Office, 30(11), (Nov. 1, 2007), 592-593.

Hawking, David, et al., "Relevance Weighting Using Distance Between Term Occurrences", TR-CS-96-08, The Australian National University, Joint Computer Science Technical Report Series, (Aug. 1996), 1-20.

Hertz, Tomer, et al., "Boosting Margin Based Distance Functions for Clustering", Proceedings of the Twenty-First International Conference on Machine Learning, (1-8), 2004.

Wilson, D. Randall, et al., "Improved Heterogeneous Distance Functions", Journal of Artificial Intelligence Research, 6, (1997), 1-34.

"European Application Serial No. 06839147.3, Examination Notification Art. 94(3) mailed Feb. 5, 2013", 6 pgs.

PRODUCT-BASED ADVERTISING

CROSS-REFERENCE TO RELATED APPLICATIONS

This application is a continuation of and claims priority to U.S. patent application Ser. No. 11/321,540, filed Dec. 29, 2005, entitled, "PRODUCT-BASED ADVERTISING," which is hereby incorporated by reference in its entirety as if set forth herein.

FIELD

The material disclosed herein relates generally to the field of information management, including apparatus, systems, and methods to manage information related to products and services offered for sale in a networked environment.

BACKGROUND

In an on-line shopping environment, sellers may offer products and services to buyers for purchase, either directly, or at auction. Traditionally, the seller relies on the selection of one or more keywords by the potential buyer, entered into a search engine, to locate the product or service offered for sale, perhaps as displayed within an advertisement or "ad."

One business model invites the seller to purchase keywords that might be deemed relevant to potential buyers. In this case, the seller offers to pay a fee to a third party provider when the keywords have been viewed or clicked-through by interested buyers (e.g., buyers that have viewed the ad or that click through the ad displayed).

The keyword purchase model leads to several considerations by the seller. The technical challenges presented include, for example, how to select keywords that are most relevant to potential buyers of a particular product? How many keywords should be purchased? What price should be paid for the keywords? If the seller chooses keywords that are irrelevant, then sales are likely to be lost. On the other hand, if relevant keywords are chosen, and the keyword price is set at auction, the price paid may be so high that only minimal profits for the seller are returned. Thus, there is a need for more efficient systems and methods to assist sellers in promoting the items they wish to sell to targeted potential buyers within a networked commerce system.

SUMMARY

According to one example embodiment, a system to identify seller ads to potential buyers within a network is provided. The system includes an interface to receive a request from a seller. The request may include, but is not limited to, a product identification (e.g., a product title for display in a seller ad, a product identification number, a barcode number). The request may also include one or more financial metrics (e.g., the cost of goods sold, expected sales price, desired gross profit after the sale, the price the seller is ready to pay for each advertisement displayed to the end user, or the price the seller is ready to pay for each click-through, or lead generated through his ad). The system may also have a catalog component including a set of identification entries that identify a standard plurality of products, as well as an advertising module to assign to each product identification of the seller, a matching identification entry included in the set of identification entries, based on a distance function and the product identification. The advertising module may also operate to identify one or more seller ads associated with the matching identification entry, as determined by a relevance function based on the distance measured between the matching identification entry and at least one extracted identification entry taken from a selected content page and included in the set of identification entries (and perhaps some of the financial metrics).

According to a further example embodiment, the system may not require the sellers to enter the price to be paid for each advertisement displayed to the end user, or for each click-through or lead generated through his ad, but rather, may operate to compute on behalf of the seller such prices using one or more financial metrics provided by the seller (e.g., cost of goods sold, expected gross margin, expected sale price of the item, etc.)

According to a further example embodiment, a method to identify seller ads to potential buyers within a network is provided. The method includes receiving a request from a seller including a product identification, and assigning to the seller, based on a distance function and the product identification, a matching identification entry included in a set of identification entries. The request may also include one or more financial metrics. The method may also include identifying at least one seller ad associated with the matching identification entry, as determined by a distance measured between the matching identification entry and at least one extracted identification entry taken from a selected content page and included in the set of identification entries. The identification of the seller ad(s) may also be determined by a relevance function based on the financial metrics.

Other features of various embodiments of the invention will be apparent from the accompanying drawings and from the detailed description that follows.

BRIEF DESCRIPTION OF THE DRAWINGS

Embodiments of the invention are illustrated by way of example and not limitation in the figures of the accompanying drawings, in which like references indicate similar elements and in which.

DETAILED DESCRIPTION

A system and method to identify seller ads to potential buyers within a network-based commerce system are described. In the following description, for purposes of explanation, numerous specific details are set forth in order to provide a thorough understanding of the various embodiments. It will be evident, however, to one skilled in the art that many of the embodiments described may be practiced without these specific details. In the description, "items" or "offerings" include both goods and services to be offered for sale in the future, currently offered for sale, or sold in a network-based commerce system and/or e-commerce environment.

Platform Architecture

Figure 1:
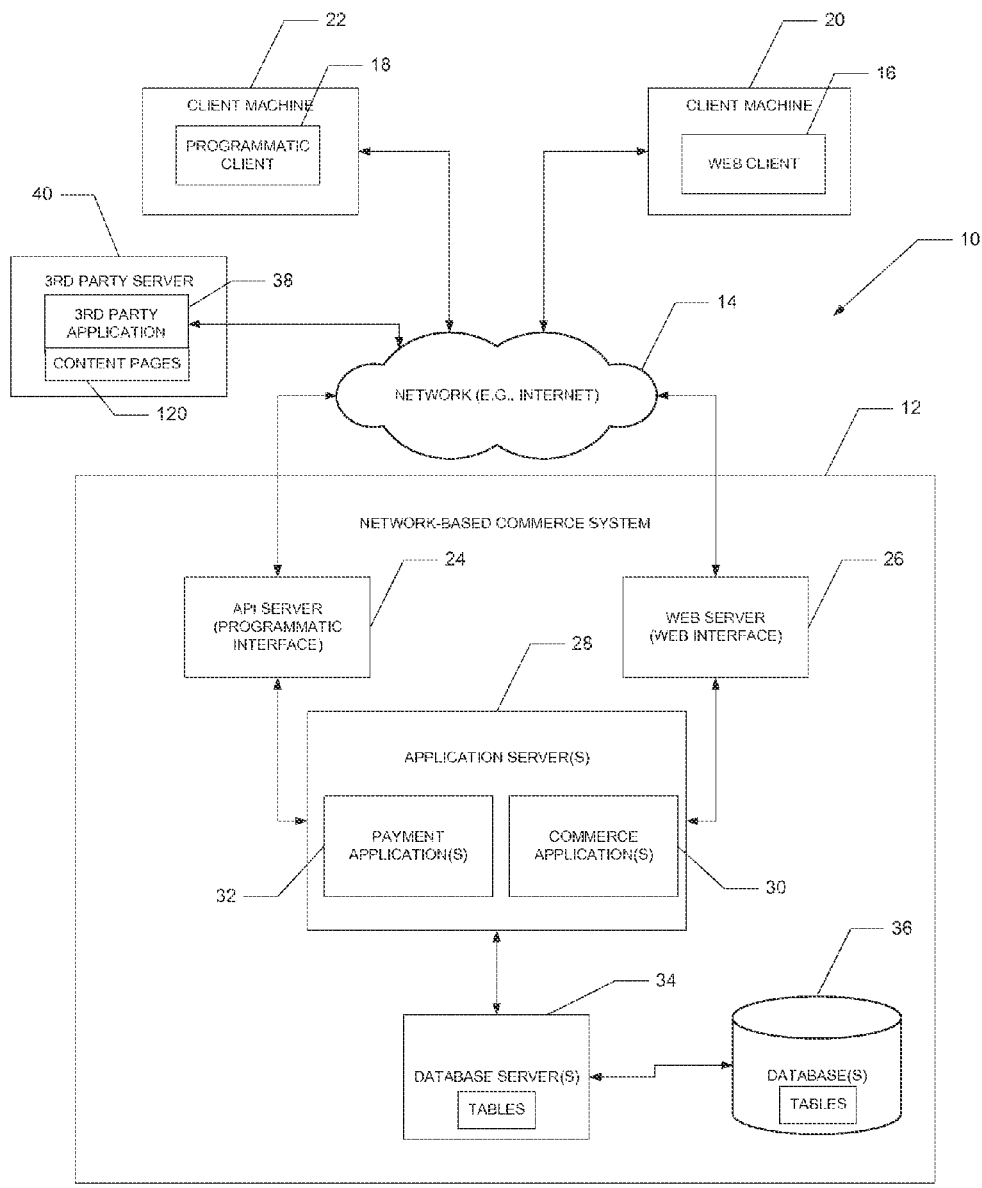
FIG. 1 is a is a network diagram depicting a system, according to one example embodiment of the invention.

FIG. 1 is a network diagram depicting a system 10, according to one example embodiment of the invention, using a client-server architecture. A network-based commerce system 12 (e.g., a network-based commerce system facilitating transactions between multiple sellers and multiple buyers) provides server-side functionality via a network 14 (e.g., the Internet) to one or more clients, such as a web client 16 (e.g., a browser, such as the Internet Explorer browser developed by Microsoft Corporation of Redmond, Wash. or the FireFox browser provided by Mozilla Corporation of Mountain View, Calif., or a wireless browser, as is used in the case of certain cellular telephones), and a programmatic client 18 executing on respective client machines 20 and 22. Each of the clients 16 or 18 may further include (or provide access to) communications applications (e.g., email, instant messaging, text chat, or Voice over IP (VoIP) applications), enabling users of the commerce system 12 to communicate. An Application Program Interface (API) server 24 and a web server 26 may be coupled, and provide program and web interfaces respectively, to one or more application servers 28. The application servers 28 may host one or more commerce applications 30 and payment applications 32. The application servers 28 may, in turn, be coupled to one or more databases servers 34 that facilitate access to one or more databases 36.

The commerce applications 30 provide a number of commerce functions and services to users that access the commerce system 12. The payment applications 32 likewise provide a number of payment services and functions to those users. For example, the payment applications 32 may allow users to qualify for, and accumulate, value (e.g., in a commercial currency, such as the U.S. dollar, or a proprietary currency, such as "points") in accounts, and then later to redeem the accumulated value for products (e.g., goods or services) that are made available via the commerce applications 30. While the commerce and payment applications 30 and 32 shown in FIG. 1 form part of the network-based commerce system 12, it will be appreciated that, in alternative embodiments of the invention, the payment applications 32 may form part of a payment service that is separate and distinct from the commerce system 12.

Further, while the system 10 shown in FIG. 1 employs a client-server architecture, embodiments of the invention are not limited to such, and may just as well utilize a distributed, or peer-to-peer, architecture. The various commerce and payment applications 30 and 32 can also be implemented as standalone software programs, with or without individual networking capabilities.

The web client 16 may access the various commerce and payment applications 30 and 32 via the web interface supported by the web server 26. Similarly, the programmatic client 18 can access the various services and functions provided by the commerce and payment applications 30 and 32 via the program interface of the API server 24. The programmatic client 18 may, for example, comprise a seller application (e.g., the TurboLister application developed by eBay Inc., of San Jose, Calif.) to enable sellers to author and manage listings on the commerce system 12 in an off-line manner, and to perform batch-mode communications between the programmatic client 18 and the network-based commerce system 12.

A third party application 38, executing on a third party server machine 40, may also have programmed (e.g., computer-implemented) access to the network-based commerce system 12 via the program interface of the API server 24. For example, the third party application 38 may, utilizing information retrieved from the network-based commerce system 12, support one or more features or functions on a website hosted by the third party. The third party website may, for example, provide one or more promotional, commerce, or payment functions that are supported by the relevant applications of the network-based commerce system 12.

In some embodiments, the third party server machine 40 may be used to host a variety of content pages 120, such as on-line magazines, newspapers, blogs, individual web sites, and the like. The information included in the content pages 120 may be transmitted to the network-based commerce system 12 on aperiodic basis, on request by the system 12, or whenever new information becomes available. Advertising (or ads) may be transmitted from the network-based commerce system 12 to be placed in the content pages 120 according to the operation of the systems and methods described herein.

Commerce Applications

Figure 2:
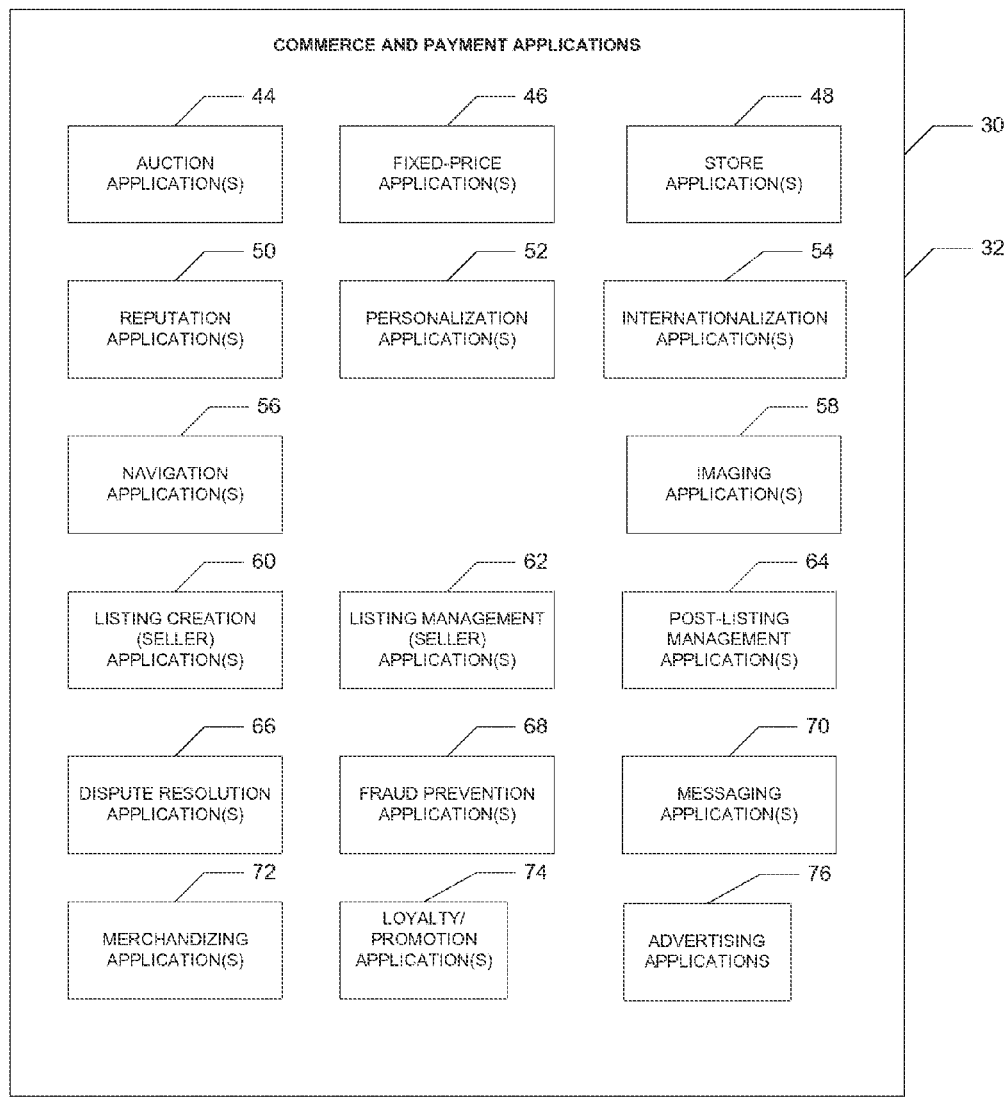
FIG. 2 is a block diagram illustrating multiple commerce and payment applications.

FIG. 2 is a block diagram illustrating multiple commerce and payment applications 30 and 32 that, in an example embodiment of the invention, are provided as part of the network-based commerce system 12. The commerce system 12 may provide a number of listing and price-setting mechanisms whereby a seller may list items, e.g., goods or services, for sale, a buyer can express interest in or indicate a desire to purchase such items, and a price can be set for a transaction associated with the items. To this end, the commerce applications 30 are shown to include one or more auction applications 44 which support auction-format listing and price setting mechanisms (e.g., English, Dutch, Vickrey, Chinese, Double, and Reverse auctions etc.). The various auction applications 44 may also provide a number of features in support of such auction-format listings, such as a reserve price specification feature whereby a seller may specify a reserve price in association with a listing and a proxy-bidding feature whereby a bidder may invoke automated proxy bidding.

A number of fixed-price applications 46 may support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with an auction-format listing, and allow a buyer to purchase goods or services, which are also being offered for sale via an auction, thr a fixed-price that is typically higher than the starting price of the auction.

Store applications 48 allow sellers to group their listings within a "virtual" store, which may be branded and otherwise personalized by and for the sellers. Such a virtual store may also offer promotions, incentives and features that are specific and personalized to a relevant seller.

Reputation applications 50 allow parties that engage in transactions utilizing the network-based commerce system 12 to establish, build, and maintain reputations, which may be made available and published to potential trading partners. For example, where the network-based commerce system 12 supports person-to-person trading, users may have no history or other reference information whereby the trustworthiness and credibility of potential trading partners may be assessed. The reputation applications 50 allow a user, for example through feedback provided by other transaction partners, to establish a reputation within the network-based commerce system 12 over time. Other potential trading partners may then reference the established reputation to assess credibility and trustworthiness.

Personalization applications 52 allow users of the commerce system 12 to personalize various aspects of their interactions with the commerce system 12. For example a user may, utilizing an appropriate personalization application 52, create a personalized reference page where information regarding transactions, to which the user is (or has been) a party, may be viewed. Further, a personalization application 52 may enable a user to personalize listings and other aspects of their interactions with the commerce system 12 and other parties.

In one embodiment, the network-based commerce system 12 may support a number of commerce systems that are customized, for example, for specific geographic regions. Thus, a version of the commerce system 12 may be customized for the United Kingdom, whereas another version of the commerce system 12 may be customized for the United States. Each of these versions may operate as an independent commerce system 12, or may be provided as customized (or internationalized) presentations associated with a single common underlying commerce system 12.

Navigating the network-based commerce system 12 can be facilitated by one or more navigation applications 56. For example, a search application may enable key word searches of listings published via the commerce system 12. A browser application may permit users to browse various category, catalogue, or inventory data structures that operate to classify listings within the commerce system 12. Various other navigation applications may be provided to supplement the search and browsing applications.

In order to make item listings available via the network-based commerce system 12 as informative and visually attractive as possible, the commerce applications 30 may include one or more imaging applications 58 that can be used to upload images for inclusion within item listings. An imaging application 58 may also operate to incorporate images within viewed listings. The imaging applications 58 can support one or more promotional features, including image galleries that are presented to potential buyers. For example, sellers may pay an additional fee to have an image included within a gallery of images for promoted items.

Listing creation applications 60 may allow sellers to author listings having information associated with selected goods or services that are to be offered for sale as part of transactions conducted within the commerce system 12. These listing creation applications 60 may receive offer data associated with offerings from a plurality of potential sellers.

Listing management applications 62 allow sellers to manage one or more of the listings that may have been created using a variety of mechanisms, including the listing creation applications 60 described above. Specifically, where a particular seller has authored and/or published a large number of listings, the management of such listings may present a challenge. The listing management applications 62 may provide a number of features (e.g., auto-relisting, inventory level monitors, etc.) to assist the seller in managing such listings. One or more post-listing management applications 64 can also assist sellers with a number of activities that typically occur after an item or service has been sold. For example, upon completion of an auction facilitated by one or more auction applications 44, a seller may wish to leave feedback regarding a particular buyer that can be accessed by other users of the system 12. To this end, a post-listing management application 64 may provide an interface to one or more reputation applications 50, as a convenient way for the seller to provide feedback regarding one or more buyers which have interacted with that seller.

Dispute resolution applications 66 provide a mechanism to resolve disputes arising between parties to a transaction. For example, the dispute resolution applications 66 may provide guided procedures whereby the parties are led through a number of activities in an attempt to settle a dispute. In the event that a particular dispute cannot be settled via the guided procedures, the dispute may be passed on to a third party mediator or arbitrator for resolution. Fraud prevention applications 68 may be used to implement various fraud detection and prevention mechanisms to reduce the occurrence of fraud within the commerce system 12.

Messaging applications 70 can be used to generate and deliver messages to users of the network-based commerce system 12. Such messages may be used, for example, to advise users regarding the status of item listings within the commerce system 12 (e.g., providing "you have been outbid" notices to bidders during an auction process, or to provide promotional and merchandising information to users).

Merchandising applications 72 may be used to support various merchandising functions that enable sellers to increase their level of sales via the commerce system 12. The merchandising applications 80 also operate the various merchandising features that may be invoked by sellers, and may be used to monitor the success of various merchandising strategies employed by sellers.

The network-based commerce system 12 itself, or one or more parties that enter transactions using the commerce system 12, may operate loyalty programs supported by one or more loyalty/promotions applications 74. For example, a buyer may earn loyalty or promotion points for each transaction established and/or concluded with a particular seller, and offered rewards that can be redeemed using some number of accumulated loyalty points.

Advertising applications 76, which may form a part of the merchandizing applications 72, may be used to identify seller ads to potential buyers within the system 10. In some embodiments, a series of three operations are used to identify the ads for display.

First, a request from the seller is received, perhaps including a product identification (e.g., the title of an item to be offered for sale via advertising). The request may also include one or more financial metrics (e.g., price at which a product is to be sold, expected gross margin, price the seller is ready to pay to display an ad for that product (e.g., display price), or price the seller is ready to pay for each end user that would click-through his ad (e.g., click-through price), price the seller is ready to pay for each lead the advertisement system sends him (e.g., lead price), etc).

Second, one or more identification entries matching the product identification are located in a catalog of identification entries. At least one of these is assigned to the seller, based on the use of a distance function. The matching identification entries, determined by the system 12, may be viewed as taking the place of "key words" selected manually by sellers in conventional systems.

Third, a seller ad that includes the matching identification entry is identified (and perhaps displayed) as determined by a relevance function (e.g., determined by the distance between the matching identification entry and an entry extracted from a third party content page, such as a web site page, that matches an identification entry in the catalog). The detailed operation of the advertising applications 76 are described next.

Figure 3:
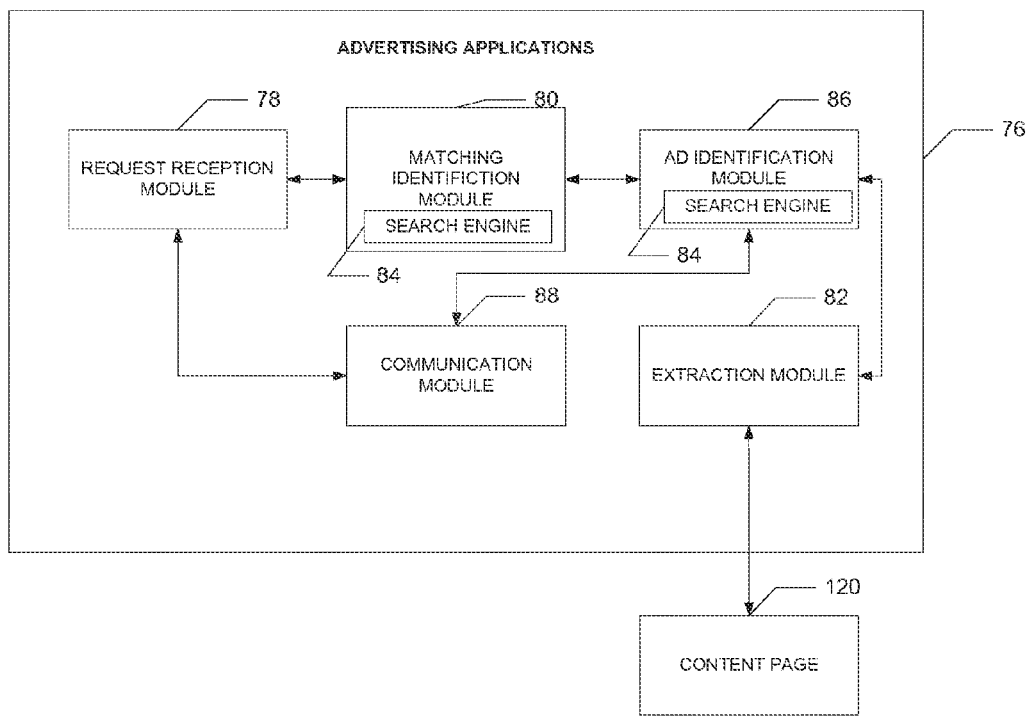
FIG. 3 is a block diagram illustrating advertising applications.
Figure 4A:
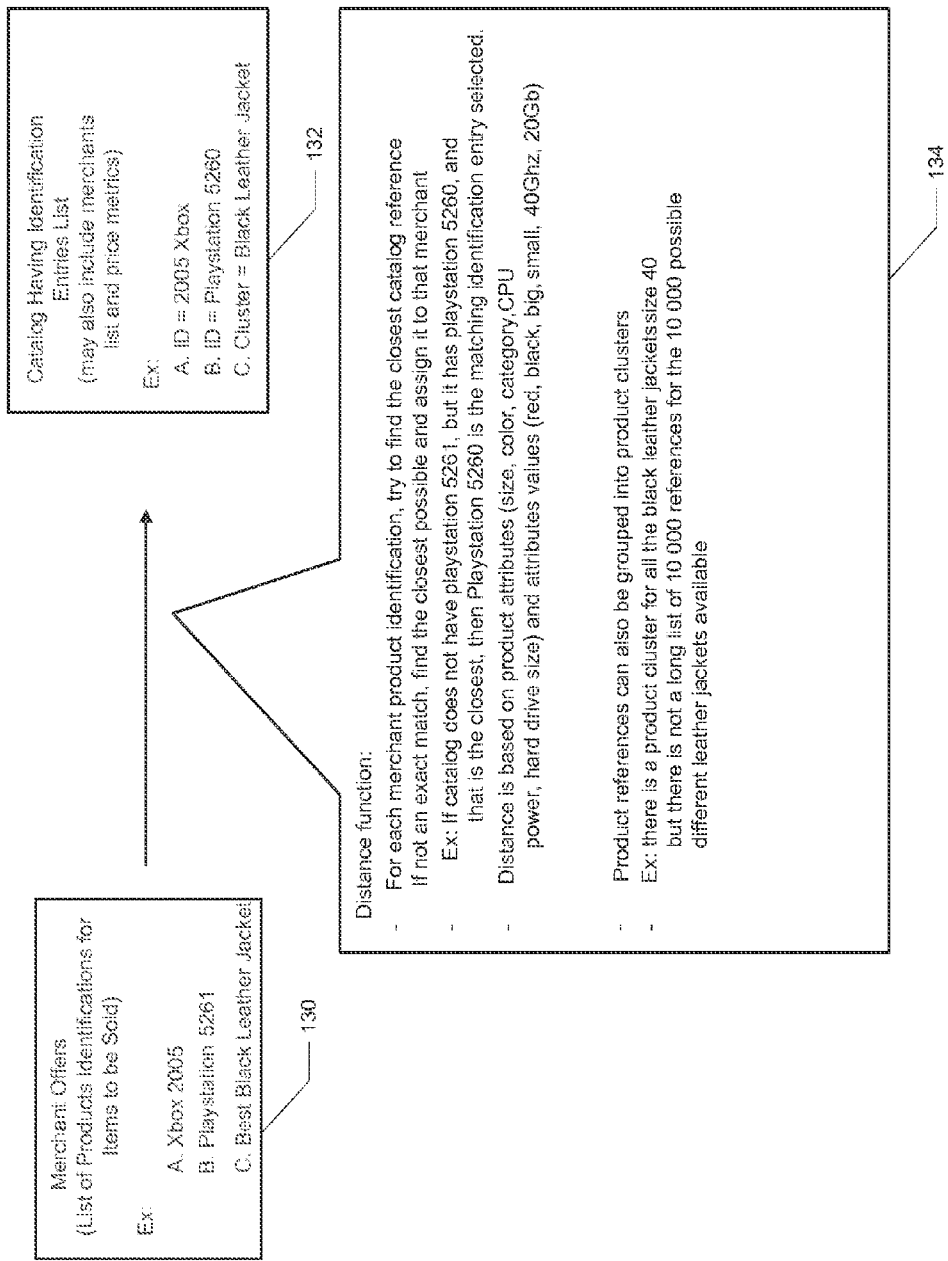
FIGS. 4A-4B are block diagrams of pre-processing and ad processing activities, respectively, according to various embodiments of the invention.
Figure 4B:
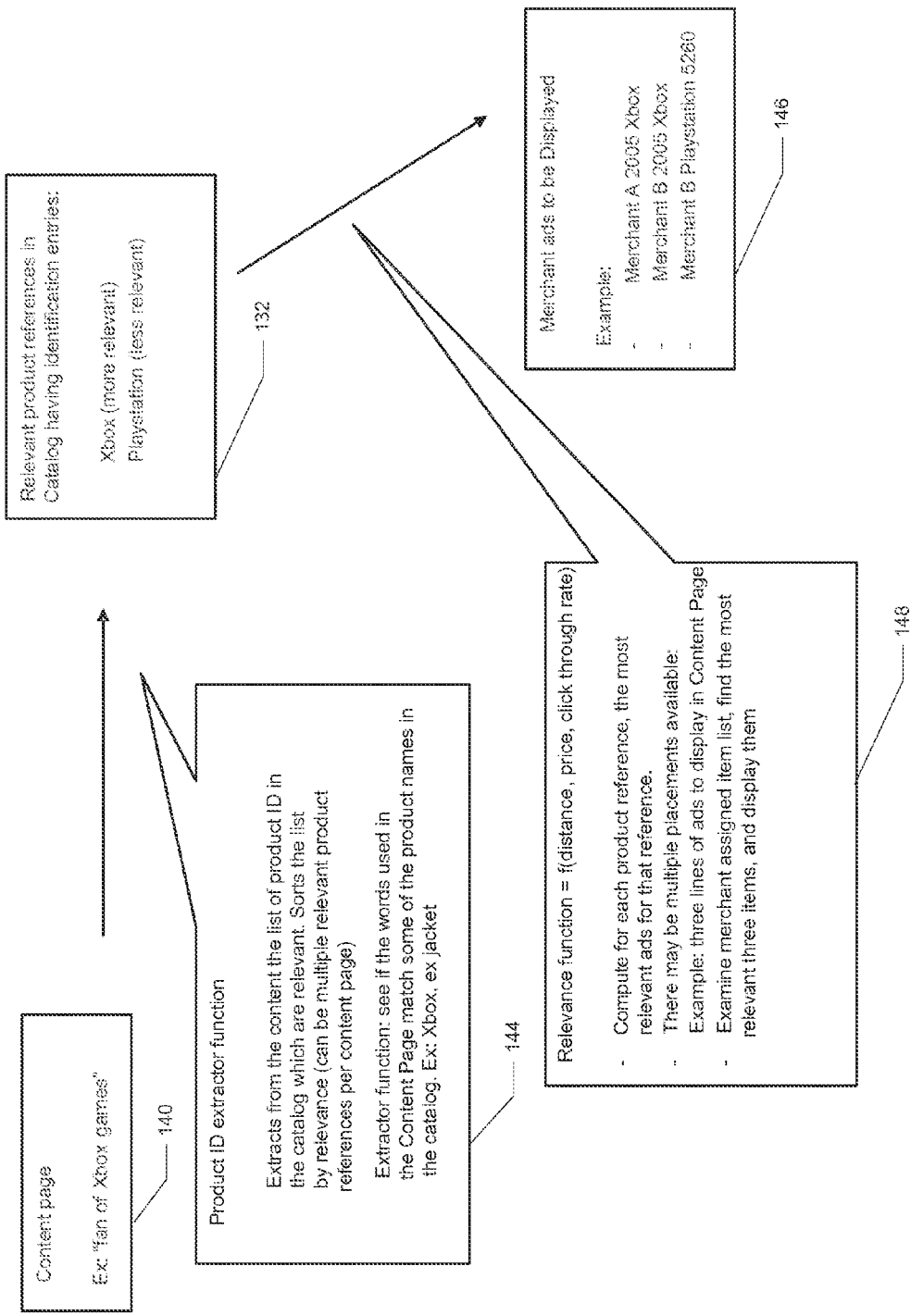

FIG. 3 shows a block diagram of a request reception module 78, a matching identification module 80, an extraction module 82, an ad identification module 86, and a communication module 88 that may form part of the advertising applications 76. FIGS. 4A and 4B are block diagrams of seller information pre-processing and ad processing activities, respectively, according to various embodiments of the invention.

Referring now to FIGS. 3, 4A, and 4B, it can be seen that the request reception module 78 receives a request from the potential seller that includes the product identification (e.g., an item title that the seller proposes to associate with the item for sale, such as "Grayco Baby Stroller"). The request may also include a financial metric (e.g., $100 sale price, 10% gross profit, 5% net profit, $5 USD profit, 10 items sold with −$10 profit and 100 items sold with $10 profit, $5 for each lead received through the system (e.g., $5 lead price), $4 for each phone call received by a buyer that saw the corresponding ad (e.g., $4 phone-in price), etc.). Examples of potential product identification text are shown in block 130 of FIG. 4A. In some embodiments, the product identification provided by a seller may include any number of identifying elements, such as a picture, a list of attributes, and/or a title of the item to be offered for sale.

The financial metric may include any kind of indication of the profit expected by the seller. If the financial metric is an absolute amount (e.g., $10 USD sales price), then perhaps only one number is needed. However, in some cases, the financial metric will comprise two or more numbers, such as a selected minimum price, a selling price, the cost of goods sold, a number of units to be sold at a selected loss amount, a gross profit margin, a net profit margin, a manufacturer's suggested retail price, or a target sales price, among others. In this manner, if the seller declines to directly compute a bid or price to pay for each ad, each click-through or lead sent to him, for application to advertising space that will be allocated to him in the future, the financial metric itself can be used to compute an equivalent bid/price to be paid by the seller and thus, to determine whether or not the seller's ad is the most appropriate for placement within a particular content page 120.

The matching identification module 80 may receive the product identification from the request reception module 78 and operate to match the product identification text with entries in a standardized catalog 132 of identification entries. In some embodiments, prior to conducting the matching operation, the product identification may be "tokenized" or broken down into separate terms to accomplish this function. For example, if the item identification is "A-1 Grayco® Baby Stroller" then the resulting tokens produced by the parsing module might be: "a" and "1" and "grayco" and "baby" and "stroller". That is, the tokenizing process may operate to accomplish any of the following actions: (a) remove all non-alphanumeric characters from the item identification; (b) change any upper-case characters to lower-case characters; and (c) extract the remaining individual terms as tokens.

As shown in FIG. 4A, the product identification of "Xbox 2005" in block 130 may be matched with the catalog entry "2005 Xbox" in the catalog 132. Matching occurs as a result of implementing a distance function, described in block 134. That is, the product identification is compared against all of the entries in the catalog, and the entry or entries having the shortest distance from the product identification can be selected as "matching" identification entries. If there is no exact match (e.g., where the distance is zero), then the closest match will be selected (e.g., where the distance is shorter than any other comparison distance).

The product identification supplied by the seller may comprise one or more stock keeping units (SKUs), brands, manufacturer's part numbers, a generic identification (e.g., "shoe" or "jacket"), a list of similar seller stock units, or a list of similar catalog entries included in the set of identification entries maintained in the catalog 132. This permits great flexibility on the part of the seller, who may elect to identify a particular product (e.g., product identification=playstation 5261), but is also willing to advertise in any type of game console environment (e.g., product identification=game console).

The distance function can be calculated in a variety of ways. For example, the distance function can be based on product attributes, such that a greater number of matching attributes operates to decrease the distance in the item catalog space between the product identification and the matching identification entries.

The distance function can also be based on categories. One example of a category is "clothing and accessories." Others, include, but are certainly not limited to: "computers and office equipment," "motor vehicles," and "toys." The categories may be accessible in the form of a category listing tree, including sub-categories. To further the example, sub-categories for the "computers and office equipment" category may include, but are not limited to: "laptop computers" and "desktop computers". Leaf categories for laptop computers may include, but are not limited to: "14" screen or smaller" and "15" screen or larger."

Depending on the item, instead of locating a matching identification entry that points to a specific item, a cluster of similar items may be located. That is, the matching identification entry may comprise a specific product identification entry, or a cluster of similar identification entries. For example, if the product identification provided by the seller is "The Best Black Leather Jacket", then the product identification may be matched to a cluster titled "black leather jacket", instead of trying to match up the product identification with a specific one of 10,000 types different of leather jackets. As another example, consider the product identification "Xbox 2005"; the closest clusters might be "console games," "entertainment," and/or "consumer electronics."

A search engine component 84 may be included in the matching identification module 80 to locate matching identification entries and/or clusters in the catalog 132. The search engine component 84 may comprise any number and type of search engines known to those of skill in the art.

The extraction module 82 operates to extract catalog 132 identification entries from content pages 120. For example, if a third party maintains content pages 120 on a network, and has an advertising arrangement with the provider of the network-based commerce system 12 (see FIG. 1), then the third party may make advertising space available to the provider within the content pages 120. To determine which ads will be placed in the content pages 120, identification entries (taken from the same set of catalog 132 entries that have been matched to seller product identifications, or at least, to those identification entries and/or clusters closest in distance to them) are extracted from the information contained in the content pages 120.

For example, as shown in FIG. 4B, the information on the content pages 120 might be "fan of xbox games". The most relevant entries in the catalog 132 might be "Xbox" (more relevant) and "Playstation" (less relevant).

The ad identification module 86 may now operate to compute, for each product identified by the product extractor function 144, the most relevant ads for those products. Identification involves the use of a relevance function that depends on the financial metric e.g., how much the seller willing to pay to have his ad placed on a content page 120 or how much he is ready to pay for each lead sent to him as a result of displaying his ad) and a distance measured between the matching identification entries shown in the catalog 132 of FIGS. 4A-4B, and one or more of the extracted identification entries that have been extracted from the content pages 120 (and are included in the set of identification entries of the catalog 132).

As is the case with the matching identification module 80, the ad identification module 86 may include one or more search engine components 84 to locate relevant seller ads for placement on the content pages 120. Ads may also be deemed more relevant when the advertised items contained therein are part of a selected product cluster, such as a product cluster that has been extracted from the content pages 120.

For example, assume a content page 120 that has advertising space available is about cheat codes on console games, and there is a greater amount of content on that particular page concerning "playstation" than "xbox." Also assume there are two seller ads available, having identification entries and financial metrics describing the amount the seller is ready to pay to the ad network provider for each lead he receives from the ad network of "playstation $2" and "xbox $10", respectively.

Which will be displayed? Click-through rates will vary depending on how relevant are the ads to the content displayed on the page where the ad will be displayed. The playstation ad is closer in distance to the information on the content page 120, but the financial metric is much higher for the xbox ad. The ad network will typically be interested in displaying as much as possible the xbox ad and therefore maximizing revenues for the ad network provider. On the other hand, if the distance calculated between the xbox ad and the information extracted from the content page 120 is too great, potential buyers may not select it and the revenue of the ad network may be close to zero.

In mathematics, an Euclidean space is a generalization of the 2- and 3-dimensional spaces studied by Euclid. The generalization applies Euclid's concept of distance, and the related concepts of length and angle, to a coordinate system in any number of dimensions. It is an example of a finite-dimensional, real, inner product space. As is known to those of skill in the art, in Euclidean N-space, the definition of distance between two point $P=(p_1, p_2, \ldots, p_n)$ and $Q=(q_1, q_2, \ldots, q_n)$ may be shown as:

$$\sqrt{(p_1-q_1)^2+(p_2-q_2)^2+\ldots+(p_n-q_n)^2} = \sqrt{\sum_{i=1}^{n}(p_i-q_i)^2}$$

Thus, for example, in many embodiments an apparatus and system can map all the N possible product attributes (e.g., color, size, category, condition (e.g., new or used), location, shipping costs, etc.) into an N-dimensional Euclid space. Then the distance function can be defined in the Euclidean N-space. Of course, weights may be added for specific attributes according to relative importance with respect to distance and to the designer of the apparatus and systems described (e.g., for instance, the distance or difference between two items of two different categories may be much more important than the distance/difference between of the same items having two different colors).

Click-through rates associated with a particular seller may also be considered. For example, if two sellers are proposing playstation ads, but one of them is very reputable, and the other is relatively unknown, the click-through rate may be relatively high for the ad of the more reputable one, compared to the other one. In the end, the provider of the system 12 must decide how each of the factors (e.g., distance, financial metric, and seller click-through rate) that make up the relevance function relate to each other, and then assign them weighting values using a particular formula. Thus, for example, a relevance function R might be calculated as:

$$R=(\text{weight1}*1/\text{distance})+(\text{weight2}*\text{profit\_metric})+ (\text{weight3}*\text{click\_through\_rate}),$$

where weight 1, weight2, and weight3 may be assigned arbitrary values that relate to one another according to the order of magnitude that distance, financial metric, and click-through rate have should have to one another as selected by the system 12 provider.

Many other relevance formulas may be implemented, as is known to those of skill in the art. Distance functions are also well known to those of skill in the art. For example, further information with respect to relevance and distance functions may be acquired by referring to the following articles, among others: "Relevance Weighting Using Distance Between Term Occurrences," TR-CS-96-08, Joint Computer Science and Technical Report Series, The Australian National University, Hawking et al., 1996; "Boosting Margin Based Distance Functions for Clustering," International Conference on Machine Learning, Hertz et al., 2004; and "Improved Heterogeneous Distance Functions," Journal of Artificial Intelligence Research, Wilson et al., 1997; each incorporated herein by reference in their entirety.

The communication module 88, which may form a part of the messaging applications 70 (shown in FIG. 2), may be used to communicate requests, or parts of requests (e.g., the product identification, such as the item title; and the financial metric) to the request reception module 78. The communication module 88 may also be used to receive and communicate ads selected for display at block 146 (as determined by the relevance function of block 148) to the third party that maintains content pages 120 having available advertising space.

Thus, referring now to FIGS. 1, 2, 3, and 4A-4b, in some embodiments, a system 12 may include an interface (e.g., the request reception module 78) to receive one or more requests from a seller. Each request may include a product identification and/or a financial metric. The system 12 may include a catalog component including a set of identification entries (e.g., the catalog 132). The system 12 may also include one or more modules (e.g., such as an advertising module 330 shown in FIG. 6, perhaps included as part of the application server(s) 28) to assign to the seller, based on a distance function and the product identification, a matching identification entry included in the set of identification entries. That is, the distance function may be used to indicate the degree of similarity between the product identification received from the seller, and the numerous identification entries in the catalog 132.

The module 330 may also operate to identify one or more seller ads associated with the matching identification entry, determined by a relevance function based on the financial metric and a distance measured between the matching identification entry and the extracted identification entries extracted from the content pages 120 (and included in the set of identification entries in the catalog 123). The interface may comprise a network communications interface, such as a computer, a server, or a network interface card, either wired or wireless.

In some embodiments, the system 12 may include one or more database components, including tables (e.g., the tables 90 shown in FIG. 4 which may be stored and accessed as part of the database server(s) 34 and/or database(s) 36 of FIG. 1). The system 12 may also include one or more search engine components (e.g., search engine component 84) to locate matching identifications, and relevant seller ads.

Various parts of the system 12 may be used to store different types of data. For example, in some embodiments, the system 12 may have one or more servers (e.g., database server(s) 34 in FIG. 1) that include the catalog component 132 (of FIGS. 4A-4B). The system 12 may also have one or more servers that include the interface to receive the request from the seller (e.g., the web server 26 in FIG. 1). Many other arrangements are possible.

Data Structures

Figure 5:
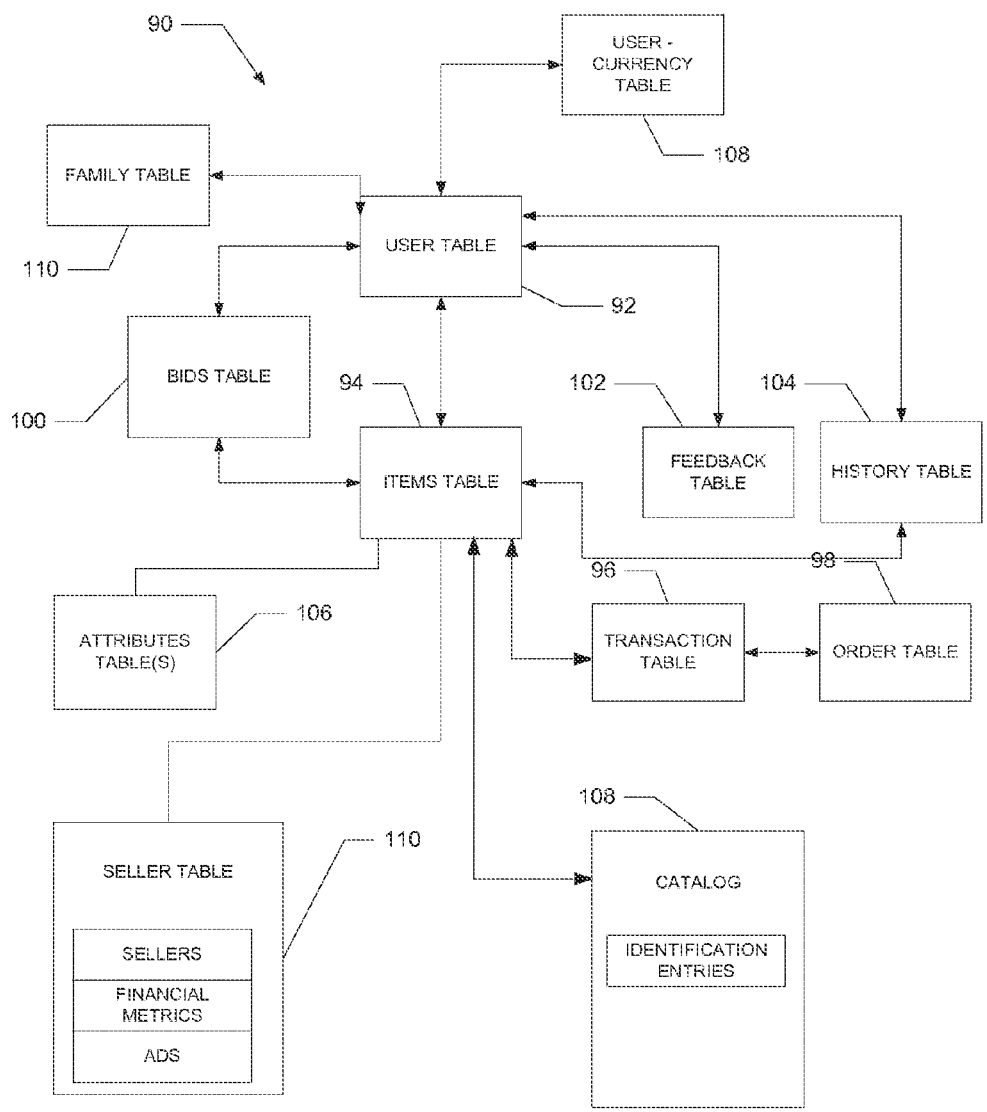
FIG. 5 is a high-level tabular entity relationship diagram.

FIG. 5 is a high-level entity-relationship diagram, illustrating various tables 90 that may be maintained within the database servers 34 and databases 36, and that are utilized by the commerce and payment applications 30 and 32. A user table 92 may contain one or more records for each registered user of the network-based commerce system 12, and may include identifier, address and financial instrument information pertaining to each such registered user. A user may, it will be appreciated, operate as a seller, a buyer, or both, within the network-based commerce system 12. In one example embodiment of the invention, a buyer is a user that has accumulated value (e.g., commercial or proprietary currency), and is then able to exchange the accumulated value for items that are offered for sale within the network-based commerce system 12. In addition, and/or in the alternative, a user may also be a seller. In one example embodiment of the invention, a seller is a user that has at least one item to offer for sale within the network-based commerce system 12. At different times, sellers may register as buyers, and buyers may register as sellers. Separate tables 90 may be maintained for buyers and sellers.

The tables 90 also include an items table 94 in which are maintained item records for offerings, i.e. goods and services that are available to be, or have been, sold, via the commerce system 12. Each item record within the items table 94 may furthermore be linked to one or more user records within the user table 92, so as to associate a seller and one or more actual or potential buyers with each item record. Each item record includes offer data which includes seller identification data (linked or obtained from the user table 92) and offering identification data that provides detailed information on each offering, such as the seller product identification. For example, a description of the goods or service offered or sold (e.g., item title) may be provided, together with a photograph or other information relating to the offering.

A transaction table 96 contains a record for each transaction (e.g., a purchase transaction) pertaining to items for which records exist within the items table 94.

An order table 98 is populated with order records, each order record being associated with an order. Each order, in turn, may be associated with one or more transactions for which records exist within the transactions table 96.

Bid records within a bids table 100 each relate to a bid received at the network-based commerce system 12 in connection with an auction-format listing supported by an auction application 44. Bid data typically includes item identification data, which may be obtained from or linked to the items table 94. Bid data also includes a bid amount. A feedback table 102 may be utilized by one or more reputation applications 50 (see FIG. 2), in one example embodiment, to construct and maintain user reputation information. A history table 104 may be used to maintain a history of transactions to which a user has been a party.

One or more attributes tables 106 may be used to record attribute information pertaining to items for which records exist within the items table 94. Considering a single example of such an attribute, the attributes tables 106 may indicate a brand attribute associated with a particular item, the brand attribute identifying a licensor or manufacturer of the relevant item as specified by a seller. Other attributes may include size, shape, color, construction material, country of manufacture, etc.

The catalog 108 may form a part of the items table 94, or exist as a separate entity. In some embodiments, the catalog 108 includes identification entries for some or all of the items that have been sold within the network-based commerce system 12. The catalog 108 may be similar to or identical to the catalog 132 shown in FIGS. 4A-4B.

The seller table 110 may be populated with a list of sellers, their associated financial metrics, and/or their associated ads (that are used to advertise the items for sale, previously identified by product identifications).

Thus, myriad embodiments may be realized. For example, referring now to FIGS. 1-5, it can be seen that a system 12 may include a means to receive a request from a seller, the request including a product identification and a financial metric. Such means may include a web server (e.g., web server 26 shown in FIG. 1) and/or a reception module (e.g., the request reception module 78 shown in FIG. 3), either of which may comprise a network communications interface, wired or wireless.

The system 12 may also include a means to assign to the seller, based on a distance function and the product identification, a matching identification entry included in a set of identification entries. Such means may include the matching identification module 80 (and/or a search engine component 84) as shown in FIG. 3, and in block 134 of FIG. 4A, among others.

The system 12 may also include a means to identify one or more seller ads associated with the matching identification entry, determined by a relevance function based on the financial metric and a distance measured between the matching identification entry and at least one extracted identification entry extracted from a selected content page and included in the set of identification entries. Such means may include an extraction module 82, and/or a search engine component 84, and/or an ad identification module 86 as shown in FIG. 3, and in blocks 144 and 148 of FIG. 4B, among others.

In some embodiments, the system 12 may include a catalog component 108, 132, perhaps maintained as a database in database(s) 36 and/or database server(s) 34, that include at least a portion of the set of identification entries, which may comprise some or all of the items that have been sold, and/or currently offered for sale within the network-based commerce system 12. The system 12 may include one or more search components (e.g., the navigation applications 56 shown in FIG. 1, or one or more search engine components 84 as shown in FIG. 3) to locate matching identification entries included in the set of identification entries, as well as to locate relevant ads for placement within contact pages 120.

Flowcharts

Figure 6:
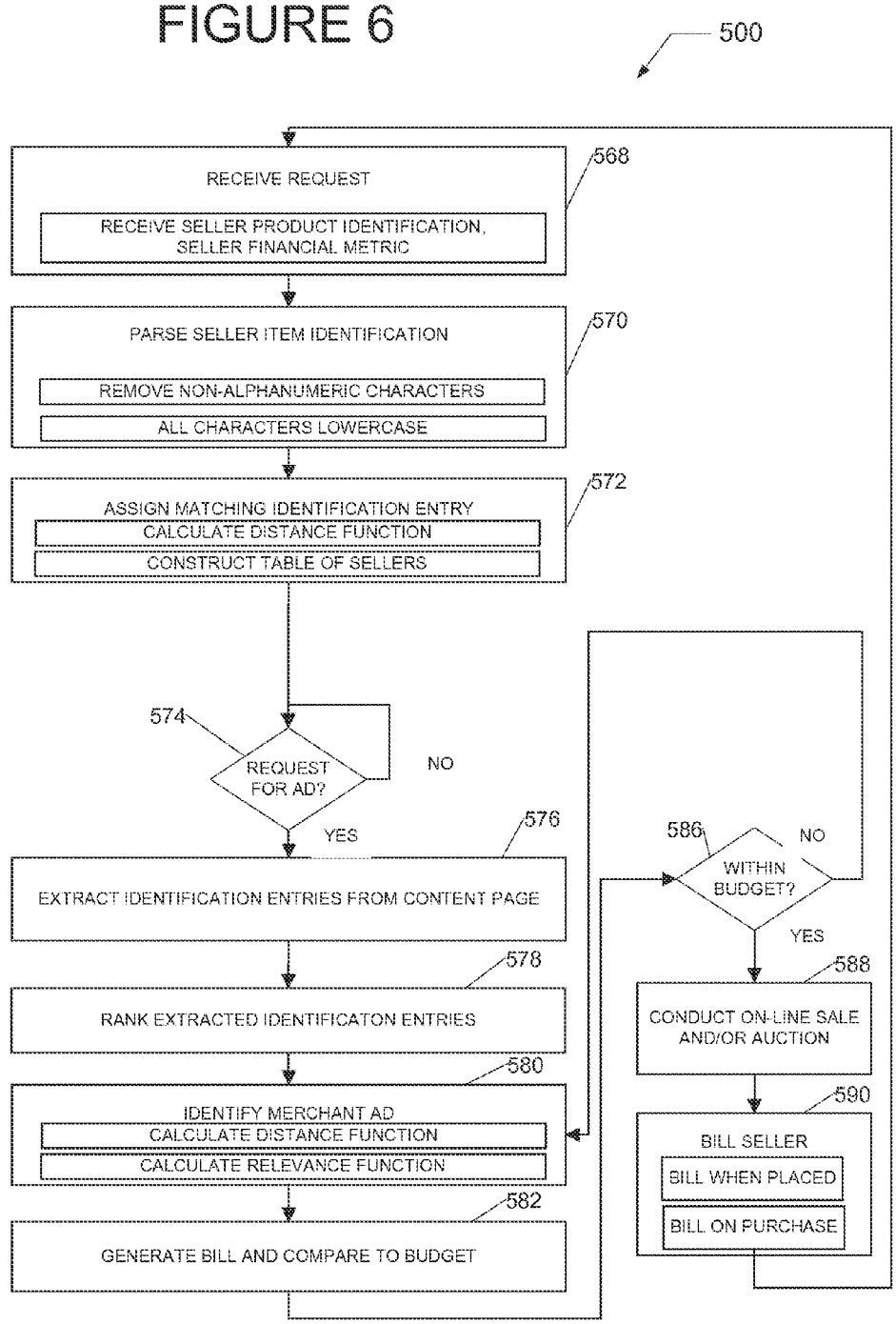
FIG. 6 is a high-level flowchart of several methods according to various embodiments of the invention.

A method of to identify seller ads to potential buyers within the system 10 is described below according to the flowchart of FIG. 6. The method 500, which may comprise a computer-implemented method, may begin with receiving a request from a seller that includes the product identification at block 568. The request may also include a desired financial metric.

At block 570, the product identification (e.g., the item title) may be tokenized, or partitioned into tokens. As noted previously, the process of tokenizing the product identification may include removing all non-alphanumeric characters and/or converting all characters to lower-case characters. Thus, the method 500 may include parsing the product identification to identify one or more tokens, which may in turn include removing non-alphanumeric characters from the item identification or tokens (if the tokens have already been extracted by parsing), and/or converting all remaining characters in the item identification or tokens to lower case characters. For example, Table I illustrates a few examples of seller product identifications, and the equivalent token content:

TABLE I

| Item Identification | Included Tokens |
|---|---|
| Ipod Nano 5 gigs | ipod nano 5 gigs |
| The Super Star Stroller #1 | the super star stroller 1 |
| Mp-3 Player @rocks.com | mp 3 player rocks com |
| A Great New Dream | a great new dream |

At block 572, the method 500 may include assigning to the seller a matching identification entry included in a set of identification entries. The assignment may be based on a distance function and the product identification, that is, a measure of the distance between the product identification and the various entries in the catalog of identification entries. The identification entry in the catalog that is the shortest distance from the product identification should be chosen. In some embodiments, assigning the matching identification entry to the seller may include selecting the matching identification entry from a specific product identification entry, or a cluster of similar identification entries if no specific product identification entry is closer in distance to the product identification provided by the seller.

The distance function may be calculated based on product categories associated with the matching identification entry. The distance function may also be calculated based on product attributes associated with the matching identification entry and/or product attribute values associated with the matching identification entry.

An attribute is a feature associated with a selected item that operates to includes the selected item as a member of a particular set or group. For example, considering a particular category, such as the "shoes" category, one attribute might be color, another attribute might be size, another attribute might be brand, and so forth. As another example, in the category of "jewelry," attributes might include, but not be limited to: stone type, cut, quality, and setting. Attribute values for the attribute "size" in shoes might include "10", "11", or "12". Attribute values for the attribute "color" in shoes might include "black", "brown", or "red". As is the case with categories, myriad variations are possible. Thus, the method 500 may include measuring distance by conducting a database search to identify a plurality of items in the catalog which have one or more attributes in common with an item associated with the product identification provided by the seller.

The distance function can also be based on historical buyer behavior. For example, if it is known that, of the buyers entering a search string of "5261", 80% are looking for a "5261 playstation" (Playstation® model number 5261) and 20% are looking for a "5261 Grayco baby stroller" (Grayco® baby stroller number 5261), then the identification entry of "5261 playstation" may be selected. If no ads (e.g., items offered for sale) have been assigned to the entry "5261 playstation" then perhaps the group of ads assigned to the cluster of "video consoles" can be shown instead, or maybe the ads assigned to the identification entry "playstation video games" can be used in their place in lieu of a preference for ads about Grayco® strollers.

In some embodiments, the method 500 may include constructing one or more table entries relating the seller, the financial metric that has been provided, and the matching item identification entry. These entries may be maintained in a seller table, such as the table 110 shown in FIG. 5.

The method 500 may continue at block 574 with receiving a request to fill advertising space included in a content page. If no request is received the method 500 will continue at block 574 until a request is received.

When the request to fill advertising space is received, the method 500 may continue at block 576 with extracting information in the form of an extracted identification entry included in the set of identification entries (e.g., from the catalog 108 of FIG. 5) from the content page that is associated with a request for ad placement. The method 500 may also include extracting one or more additional identification entries included in the set of identification entries (in the catalog).

At this point, in some embodiments, the method 500 may include ranking the extracted identification entry and the additional identification entries at block 578 based on relevance of the extracted entries to the set of identification entries included in the catalog. For example, if the catalog identification entry term "playstation" appears 10 times in the content page, while the term "xbox" appears five times, and the term "gamestation" appears only once, then ranking the identification entries in this case might include placing "playstation" first, "xbox" second, and "gamestation" third.

The method 500 may continue at block 580 with identifying one or more seller ads associated with the matching identification entry. Identification of the ads may be determined by a relevance function, perhaps based on the financial metric provided by individual sellers, and a distance measured between the matching identification entry determined for each product identification, and one or more of the extracted identification entries that have been extracted from selected content pages.

Thus, identifying the seller ad for display (e.g., inclusion in the selected content page) may include calculating another distance function between the matching identification entries for various sellers and the extracted identification entries for the content page associated with the request for ad placement received at block 576. Identifying the seller ad for display also involves calculating the relevance function, as described previously. The method 500, therefore, may include calculating the relevance function based on a click-through rate associated with each seller. In this manner, the seller-identified item for sale (via the product identification and financial metric) should be placed as an ad in the content page if it is more relevant than other items to be offered for sale in ads by other sellers. Using the systems and methods described, the seller does not need to manually select key words in order to affect product placement in advertising.

If a particular seller's ad (include the item identified by the product identification and therefore, the matching identification entry) is selected for placement, the method 500 may include, at block 582, comparing a bill to be sent to the seller to the budget remaining for that seller. The budget comparison may also be made in response to receiving a selection of an item associated with the product identification, as may occur when the initial request for ad placement in a content page is received. The item selected in this case would be associated with one of the entries in the catalog of item identifications.

If the bill to be sent to the seller is not within the seller's budget, as determined at block 586, then a new ad (e.g., associated with the same seller and a different financial metric, or even another seller) may be identified at block 580. If the bill is within the seller's budget, as determined at block 586, then the method 500 may continue with placing the ad in the content page associated with the request and conducting a sale of the seller's item on-line at block 588, either directly, or perhaps using an auction format. Thus, the method 500 may include conducting an on-line auction within a network-based commerce system with respect to a plurality of products including one or more items associated with the product identification provided by the seller at block 568.

The method 500 may continue with billing the seller at block 590. Many billing formulas are available. For example, the seller may be charged per impression (e.g., every time the ad is placed on a content page), or per "click" received from interested potential buyers that view the seller's ad on the content page, or both. Additional billing terms may include billing the seller when the ad placed on the content page generates a sales lead (e.g., the potential buyer fills out a form or emails the seller), or using revenue sharing, where the system 12 provider receives some percentage of the sales price of the item listed in the ad on the content page. They system 12 provider, the third party, or both, may track such events to ensure the requisite amount of revenue is collected from the seller.

Thus, the method 500 may include billing the seller according to the financial metric when an item offered for sale by the seller (and associated with the product identification) is advertised on the selected content page (i.e., when the ad is placed). The method 500 may also include billing the seller according to the financial metric when an item offered for sale by the seller (and associated with the product identification) is purchased via the selected content page (i.e., when the item offered for sale is purchased), among others.

Figure 7:
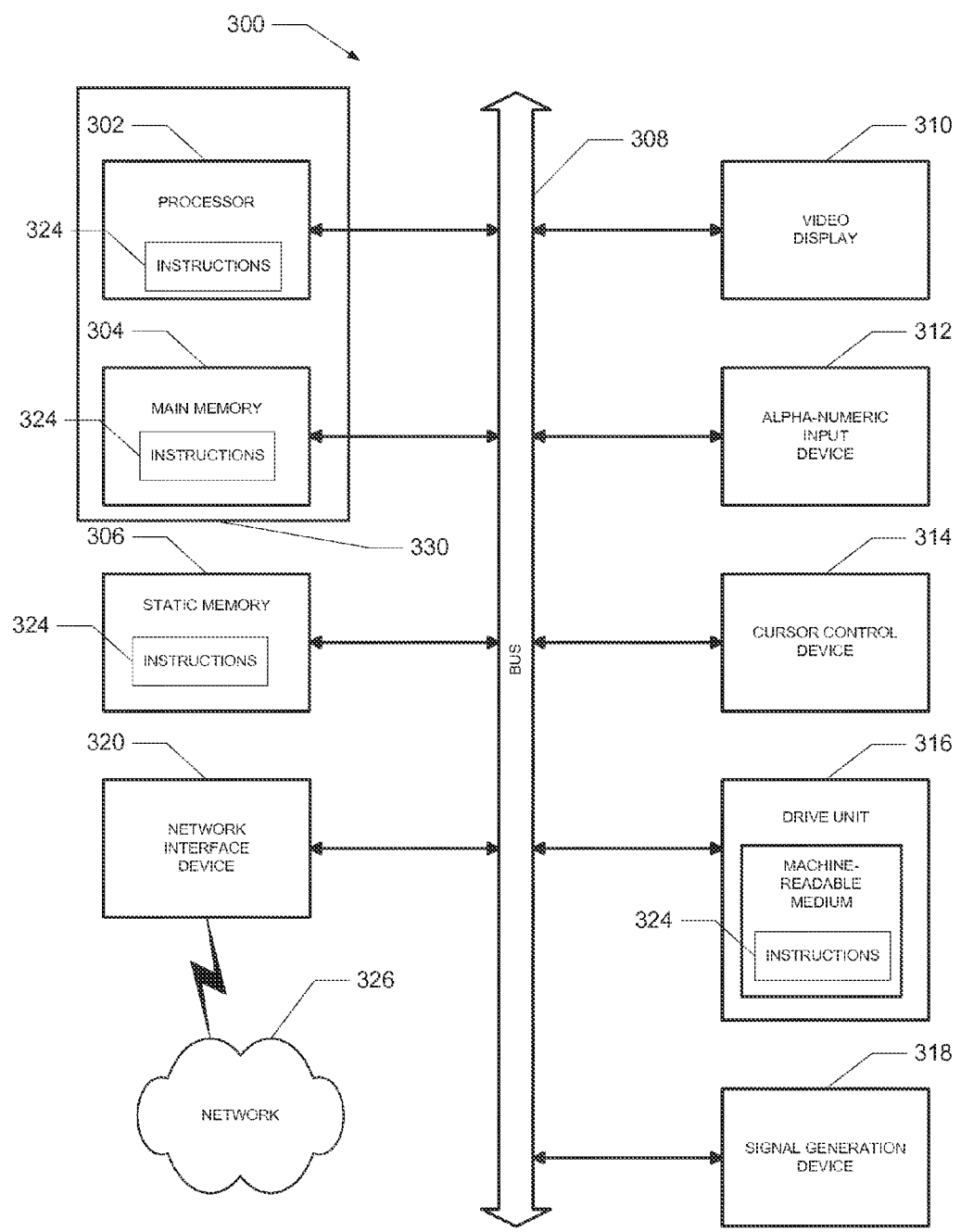
FIG. 7 is a block diagram of a machine for performing any one of the example methods described herein.

FIG. 7 shows a block diagram of a machine in the example form of a computer system 300 within which a set of instructions 324, for causing the machine to perform any one or more of the methods discussed herein, may be stored, accessed, and executed. In alternative embodiments, the machine operates as a standalone device or may be connected (e.g., networked) to other machines. In a networked deployment, the machine may operate in the capacity of a server machine, or as a client machine in server-client network environment, or even as a peer machine in a peer-to-peer (or distributed) network environment. The machine may comprise a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential, in parallel, or otherwise) that specify actions to be taken by that machine. Further, while only a single machine is illustrated, the term "machine" shall also be taken to include any collection of machines that individually or jointly execute a set (or multiple sets) of instructions 324 to perform any one or more of the methods discussed herein.

The example computer system 300 includes one or more processors 302 (e.g., one or more central processing units (CPUs) and a graphics processing unit (GPU), or both), a main memory 304 and a static memory 306, which may communicate with each other directly, or using a bus 308. The computer system 300 may further include a video display unit 310 (e.g., a flat panel display, such as a liquid crystal display (LCD), or a cathode ray tube (CRT)). The computer system 300 may also include an alphanumeric input device 312 (e.g., a keyboard, or keypad), a cursor control device 314 (e.g., a mouse, or touch screen), a disk drive unit 316, a signal generation device 318 (e.g., a speaker or headphones) and a network interface device 320. The computer system 300 may form a part of the system 10 shown in FIG. 1, including operating as part of one or more of the servers 24, 26, 28, 34, 36, and 40, and/or one or more of the machines 20 and 22. The computer system 300 may also be implemented in various configurations throughout the system 10, if so desired.

The disk drive unit 316 may include one or more machine-readable media 322 having one or more sets of instructions 324 (e.g., software) stored thereon, embodying any one or more of the methods or functions described herein. The instructions 324 may also reside, completely or at least partially, within the main memory 304 and/or within the processor 302 during execution thereof by the computer system 300, the main memory 304 and the processor 302 also constituting machine-readable media. The instructions 324 may further be transmitted or received over a network 326 via the network interface device 320. The network 326 may be similar to or identical to the network 14 of FIG. 1.

The computer system 300 may include one or more modules 330, perhaps including one or more processors 302, memory 304, and one or more sets of instructions 324. The module 330 may comprise an advertising module, for example, that operates to assign to the seller, based on a distance function and the product identification, a matching identification entry included in a set of identification entries, and to identify at least one seller ad associated with the matching identification entry, determined by a relevance function based on the at least one financial metric and a distance measured between the matching identification entry and at least one extracted identification entry extracted from a selected content page and included in the set of identification entries. Thus, the module 330 may operate to carry out one or more actions described with respect to any of the methods detailed herein.

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions 324. The term "machine-readable medium" shall also be taken to include any medium that is capable of storing, encoding, or carrying a set of instructions 324 for execution by the machine and that cause the machine to perform any one or more of the methods of the present invention. The term "machine-readable medium" shall accordingly be taken to include, but not be limited to, solid-state memories, optical and magnetic media, and carrier wave signals. The term "machine-readable medium" may be used herein interchangeably with the term "computer-readable medium." Thus, the system 10 may include a computer-readable medium having instructions 324 stored thereon which, when executed by a computer, cause the computer to perform any of the methods described herein. The computer-readable medium may be located in a desktop computer, a server, a laptop computer, or a cellular telephone, among other items.

Thus, a system 12 and method 500 to identify seller ads to potential buyers within a network-based commerce system have been described. Implementing the system 12 and method 500 may result in the ability to select seller ads for placement within content pages without the manual selection of key words by the seller.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system, including:
    a machine having at least one processor;
    an interface, executable by the at least one processor, configured to receive a request from a seller, the request including a product identification; and
    an advertising module, executable by the at least one processor, configured to assign to the seller, based on a distance function and the product identification, a matching identification entry included in a set of identification entries, and to identify at least one seller ad associated with the matching identification entry, wherein identification of the at least one seller ad is determined by a distance measured between the matching identification entry and at least one extracted identification entry extracted from a selected content page and included in the set of identification entries.

2. The system of claim 1, wherein the matching identification entry includes one of a specific product identification entry or a cluster of similar identification entries.

3. The system of claim 1, wherein the product identification includes at least one of a stock keeping unit (SKU), a brand, a manufacturer part number, a generic identification, a list of similar seller stock units, or a list of similar catalog entries included in the set of identification entries.

4. The system of claim 1, wherein the request further includes at least one financial metric, and identification of the at least one seller ad is also determined by a relevance function based on the at least one financial metric.

5. The system of claim 4, wherein the relevance function is based on a click-through rate associated with the seller.

6. The system of claim 4, wherein the at least one financial metric includes at least two of a selected minimum price, a selling price, a cost of goods sold, a number of units to be sold at a selected loss amount, a gross profit margin, a net profit margin, a manufacturer's suggested retail price, or a target sales price.

7. The system of claim 1, wherein the interface further includes:
    a network communications interface to receive the product identification.

8. The system of claim 1, further including:
    a server including a catalog component having the set of identification entries.

9. A computer-implemented method, including:
    receiving, by a machine having at least one processor, a request from a seller, the request including a product identification;
    assigning, by the machine, to the seller, based on a distance function and the product identification, a matching identification entry included in a set of identification entries; and
    identifying, by the machine, at least one seller ad associated with the matching identification entry, wherein identification of the at least one seller as is determined by a distance measured between the matching identification entry and at least one extracted identification entry extracted from a selected content page and included in the set of identification entries.

10. The computer-implemented method of claim 9, wherein assigning to the seller further includes:
    calculating the distance function based on at least one of product attributes associated with the matching identification entry or product attribute values associated with the matching identification entry.

11. The computer-implemented method of claim 9, wherein assigning to the seller further includes:
    selecting the matching identification entry from one of a specific product identification entry or a cluster of similar identification entries.

12. The computer-implemented method of claim 9, wherein identifying the at least one seller ad further includes:
    extracting the extracted identification entry included in the set of identification entries from the selected content page; and
    extracting at least one additional identification entry included the set of identification entries.

13. The computer-implemented method of claim 12, wherein identifying the at least one seller ad further includes:
    ranking the extracted identification entry and the at least one additional identification entry based on relevance to the set of identification entries.

14. The computer-implemented method of claim 9, further including:
    receiving a request to fill an advertising space included in the content page.

15. The computer-implemented method of claim 9, wherein the request further includes at least one financial metric, and identification of the at least one seller ad is also determined by a relevance function based on the at least one financial metric.

16. The computer-implemented method of claim 15, wherein identifying the at least one seller ad further includes:
    calculating the relevance function based on a click-through rate associated with the seller.

17. The computer-implemented method of claim 15, further including:
    constructing a table entry relating the seller, the financial metric, and the matching item identification entry.

18. The computer-implemented method of claim 15, further including:

billing the seller according to the financial metric when an item offered for sale by the seller and associated with the product identification is advertised on the selected content page.

19. The computer-implemented method of claim 15, further including:

billing the seller according to the financial metric when an item offered for sale by the seller and associated with the product identification is purchased via the selected content page.

20. The computer-implemented method of claim 9, further including:

comparing a bill to be sent to the seller to a remaining seller budget responsive to receiving a selection of an item associated with the product identification.

21. The computer-implemented method of claim 9, further including:

conducting an on-line auction within a network-based commerce system with respect to a plurality of products including at least one item associated with the product identification.

22. A non-transitory machine-readable storage device storing a set of instructions that, when executed by at least one processor, causes the at least one processor to perform operations comprising:

receiving a request from a seller, the request including a product identification;

assigning to the seller, based on a distance function and the product identification, a matching identification entry included in a set of identification entries; and identifying at least one seller ad associated with the matching identification entry, wherein identification of the at least one seller as is determined by a distance measured between the matching identification entry and at least one extracted identification entry extracted from a selected content page and included in the set of identification entries.

23. A system, including:

a machine having at least one processor;

a first means, executable by the at least one processor, to receive a request from a seller, the request including a product identification;

a second means, executable by the at least one processor, to assign to the seller, based on a distance function and the product identification, a matching identification entry included in a set of identification entries; and a third means, executable by the at least one processor, to identify at least one seller ad associated with the matching identification entry, wherein identification of the at least one seller ad is determined by a distance measured between the matching identification entry and at least one extracted identification entry extracted from a selected content page and included in the set of identification entries.

* * * * *

UNITED STATES PATENT AND TRADEMARK OFFICE
CERTIFICATE OF CORRECTION

| | |
|---|---|
| PATENT NO. | : 8,515,812 B2 |
| APPLICATION NO. | : 13/659143 |
| DATED | : August 20, 2013 |
| INVENTOR(S) | : Moissinac et al. |

It is certified that error appears in the above-identified patent and that said Letters Patent is hereby corrected as shown below:

In the Claims

In column 18, line 43, in Claim 12, before "the", insert --in--, therefor

Signed and Sealed this
Twenty-fifth Day of November, 2014

Michelle K. Lee
*Deputy Director of the United States Patent and Trademark Office*